(12) United States Patent
Bae

(10) Patent No.: US 9,489,065 B2
(45) Date of Patent: Nov. 8, 2016

(54) SAFETY DRIVING SYSTEM OF DISPLAY DEVICE AND SAFETY DRIVING METHOD OF DISPLAY DEVICE

(71) Applicant: Young-Min Bae, Yongin (KR)

(72) Inventor: Young-Min Bae, Yongin (KR)

(73) Assignee: SAMSUNG DISPLAY CO., LTD., Yongin, Gyunggi-do (KR)

( * ) Notice: Subject to any disclaimer, the term of this patent is extended or adjusted under 35 U.S.C. 154(b) by 80 days.

(21) Appl. No.: 13/732,603

(22) Filed: Jan. 2, 2013

(65) Prior Publication Data

US 2014/0028650 A1 Jan. 30, 2014

(30) Foreign Application Priority Data

Jul. 26, 2012 (KR) ........................ 10-2012-0081946

(51) Int. Cl.
*G06F 3/038* (2013.01)
*G09G 3/20* (2006.01)

(52) U.S. Cl.
CPC .................. *G06F 3/038* (2013.01); *G09G 3/20* (2013.01); *G09G 2330/045* (2013.01); *G09G 2330/12* (2013.01)

(58) Field of Classification Search
CPC .................. G09G 2330/02; G09G 2330/021; G09G 3/3233; G09G 3/3696; G01R 31/024; G01R 31/026
USPC ........................................ 345/173, 174, 202
See application file for complete search history.

(56) References Cited

U.S. PATENT DOCUMENTS

| | | | | |
|---|---|---|---|---|
| 5,767,454 A | * | 6/1998 | Goodwin, III | G01G 23/00 177/45 |
| 2009/0130542 A1 | * | 5/2009 | Mizoguchi | H01M 10/4207 429/61 |
| 2009/0174426 A1 | * | 7/2009 | Matoba | G01R 31/2856 324/750.03 |
| 2011/0134089 A1 | * | 6/2011 | Ozeki | G02F 1/136259 345/205 |
| 2011/0156714 A1 | * | 6/2011 | Mizoguchi | G01R 31/3658 324/434 |
| 2012/0050249 A1 | * | 3/2012 | Jin | G09G 3/20 345/212 |
| 2013/0242447 A1 | * | 9/2013 | Pirchio | G01R 31/026 361/101 |

FOREIGN PATENT DOCUMENTS

| | | |
|---|---|---|
| KR | 10-20020032037 A | 5/2002 |
| KR | 10-2007-0111717 A | 11/2007 |
| KR | 10-1015090 B1 | 2/2011 |

* cited by examiner

*Primary Examiner* — Kent Chang
*Assistant Examiner* — Mark Edwards
(74) *Attorney, Agent, or Firm* — Lee & Morse P.C.

(57) ABSTRACT

A safety driving system of a display device includes a display panel including at least one conductive detection line, the conductive detection line extending in a predetermined area of the display panel and being configured to detect voltage variation according to damage in the predetermined area, a panel detector configured to apply a reference voltage to one end of the detection line, to receive an output voltage corresponding to the reference voltage through the detection line from another end of the detection line, to compare the received output voltage with a predetermined normal voltage range, and to generate and output a detection result signal, and a controller configured to provide a detection set value for driving the panel detector and to interrupt the driving of the display panel when the output detection result signal indicates that the display panel is damaged.

5 Claims, 4 Drawing Sheets

SAFETY DRIVING SYSTEM OF DISPLAY DEVICE AND SAFETY DRIVING METHOD OF DISPLAY DEVICE

CROSS-REFERENCE TO RELATED APPLICATION

This application claims under 35 U.S.C. §119 priority to and the benefit of Korean Patent Application No. 10-2012-0081946, filed in the Korean Intellectual Property Office on Jul. 26, 2012, the entire contents of which are incorporated herein by reference.

BACKGROUND

1. Field

Example embodiments relate to a safety driving system of a display device and to a safety driving method of the display device, and more particularly, to a driving apparatus capable of improving safety by detecting an abnormal state due to damage to a panel during driving of the display device and to a safety driving system and a method using the same.

2. Description of the Related Art

Recently, with development of a semiconductor manufacturing technology and development of an image processing technology, flat panel display elements, in which light weight and thinness of a display device are easily implemented and high image quality thereof can be implemented, have been rapidly commercialized and expanded. For example, flat panel display devices include a liquid crystal display (LCD), a field emission display (FED), a plasma display panel (PDP), an organic light emitting diode (OLED) display, and the like.

The LCD, the OLED, and the like among the display elements of the flat panel display devices are widely applied to personal portable apparatuses, e.g., a mobile phone, a PDA, a portable computer, and the like due to their, e.g., light weight, thinness, and high image quality. Particularly, the OLED, as a self-emission element, receives attention as a next-generation display because its thickness is reduced without requiring a backlight of the LCD, its response speed is several tens of [ns] fast, its viewing angle is wide, and a its contrast ratio is good.

However, since the display panel of the flat panel display device is developed to have a large size, light weight, and small thickness at the same time, durability against cracks, scratches, or breakage due to an external impact may be required. For example, when cracks or the like occur in the display panel, a short may be generated in a power source applied to the display panel, so an overcurrent flows in the panel and the temperature is increased. As a result, the display panel may be burned. Further, due to the generated short, a DC-DC converter may be under an overload condition, the DC-DC converter or an inductor, i.e., a peripheral component of the DC-DC converter, may brake, thereby influencing a peripheral circuit.

SUMMARY

Example embodiments have been made in an effort to provide a safety driving system of a display device capable of preventing a screen from being abnormally displayed due to damage or capable of preventing an error from being generated in a voltage supply, by early detection of damage to a display panel to perform a driving control of the display device according to a situation.

Therefore, it is possible to provide an apparatus and a method for protecting the display device. The apparatus and display according to example embodiments are capable of safely protecting the display device from fire or overheating and are capable of preventing a user of the display device from suffering a fatal injury.

An exemplary embodiment provides a safety driving system of a display device, including a display panel with at least one conductive detection line, the conductive detection line extending in a predetermined area of the display panel and being configured to detect voltage variation according to damage in the predetermined area, a panel detector configured to apply a reference voltage to one end of the detection line, to receive an output voltage corresponding to the reference voltage through the detection line from another end of the detection line, to compare the received output voltage with a predetermined normal voltage range, and to generate and output a detection result signal, and a controller configured to provide a detection set value for driving the panel detector and to interrupt the driving of the display panel when the output detection result signal indicates that the display panel is damaged.

The panel detector and the controller may be included in a driving IC operating the display panel.

The driving IC may further include a voltage input terminal applying the reference voltage to the detection line and a voltage output terminal receiving the output voltage from the detection line.

The predetermined area may be an edge area of the display panel or an adjacent area to the driving IC driving the display panel.

The detection set value may include the reference voltage, the normal voltage range, operation period and driving interval of the panel detector, and an analysis of the detection result signal.

The controller may generate a control signal which stops or soft-resets the operation of the driving IC operating the display panel or generate a control signal interrupting the driving of a DC-DC converter.

The safety driving system of a display device may further include a panel protector configured to receive an operation starting signal according to the detection result signal from the controller to generate a control signal which stops or soft-resets the operation of the driving IC operating the display panel or generates a control signal interrupting the driving of a DC-DC converter.

The panel detector may include an amplification circuit configured to amplify the reference voltage before the reference voltage is applied to the detection line, a complex comparator including a first comparator comparing the output voltage outputted from the detection line with a highest voltage value of the normal voltage range and a second comparator comparing the output voltage with a lowest voltage value of the normal voltage range, and a combination logic configured to combine two logic signals outputted from the first comparator and the second comparator of the complex comparator to generate the detection result signal.

The amplification circuit may include an operational amplifier and a push-pull circuit.

The panel detector may further include at least one circuit of at least one resistor configured to control a voltage value on a circuit, at least one ESD circuit configured to protect the circuit from static electricity generated outside, and a noise filter configured to remove noise of a coupling factor influencing the output voltage.

A safety driving method of a display device with a conductive detection line detecting voltage variation according to damage to the panel in a predetermined area may include applying a reference voltage to one end of the detection line and receiving an output voltage corresponding to the reference voltage through the detection line from the other end of the detection line; comparing the output voltage with a normal voltage range to generate a detection result signal; and interrupting the driving of the display panel when the damage to the display panel is determined by the detection result signal.

The safety driving method may further include pre-setting detection set values such as the reference voltage, the normal voltage range, operation period and driving interval of the panel detector, and an analysis of the detection result signal, before applying the reference voltage to the detection line.

The interrupting of driving of the display panel may be any one of stopping or soft-resetting the operation of the driving IC operating the display panel or interrupting the driving of a DC-DC converter.

Further, in the comparing of the output voltage with the normal voltage range to generate the detection result signal, the detection result signal may be generated by logic-combining a first result value obtained by comparing the output voltage outputted from the detection line with a highest voltage value of the normal voltage range and a second result value obtained by comparing the output voltage with a lowest voltage value of the normal voltage range.

In the generating of the detection result signal by comparing the output voltage with the normal voltage range, noise of a coupling factor influencing the output voltage may be removed and static electricity generated outside may be removed.

DETAILED DESCRIPTION

Figure 1:
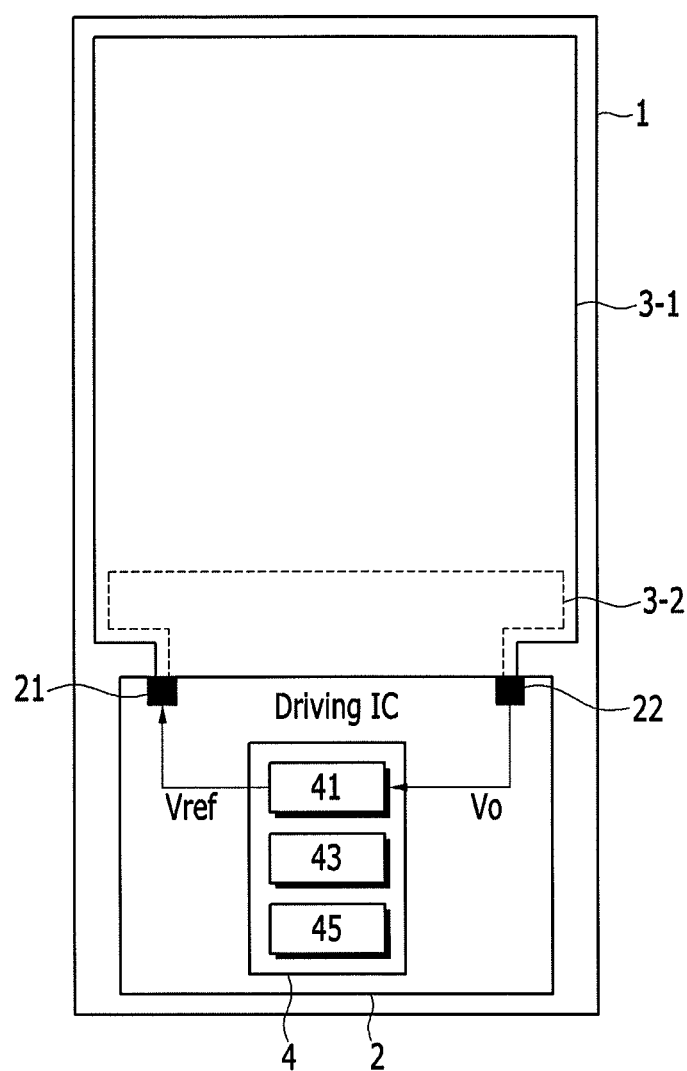
FIG. 1 is a diagram schematically illustrating a display device using a safety driving method according to an exemplary embodiment.

Example embodiments will be described more fully hereinafter with reference to the accompanying drawings. As those skilled in the art would realize, the described embodiments may be modified in various different ways, all without departing from the spirit or scope of the inventive concept.

Further, in exemplary embodiments, since like reference numerals designate like elements having the same configuration, a first exemplary embodiment is representatively described, and in other exemplary embodiments, only a configuration different from the first exemplary embodiment will be described.

The drawings and description are to be regarded as illustrative in nature and not restrictive. Like reference numerals designate like elements throughout.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a diagram schematically illustrating a display device using a safety driving method according to an exemplary embodiment.

In detail, the display device of FIG. 1 controls driving of the display device by using a detection line capable of detecting defects, e.g., cracks, scratches, or breakage, on a display panel and determining the damage to the display panel from the detected defects. As a result, as illustrated in FIG. 1, the display device applying a driving method in accordance with example embodiments includes a display panel 1 with the detection line.

In general, the display device is may include a display panel which receives an external image signal to display an image according to the external image signal and a driving IC configured of a plurality of driving circuits which supply a driving signal, a data signal, and the like to operate the display panel so that the image is displayed on the display panel.

In FIG. 1, the detection line capable of detecting damage, e.g., cracks and scratches, due to an external impact is provided on the display panel 1, and a layout form thereof may Vary. For example, as illustrated in FIG. 1, the detection line may have a form like a detection line 3-1 installed along a four-sided edge of the display panel 1. In another example, as further illustrated in FIG. 1, the detection line may have a form like a detection line 3-2 surrounding and adjacent to a driving IC 2.

In detail, the detection line 3-1 is disposed in an area including an edge of the display panel 1. For example, the detection line 3-1 may extend along a perimeter of the display panel 1 to be only in a periphery of the display panel 1, e.g., to trace lengths of at least three sides of the display panel 1.

The detection line 3-2 is disposed only in an area of a chip-on glass (COG) circuit of the driving IC 2. For example, the detection line 3-2 may extend along the driving IC 2.

The detection lines 3-1 and 3-2 may be made of any suitable materials. For example, the detection lines 3-1 and 3-2 may be made of conductive metal lines capable of being influenced by a current flow against damage, e.g., cracks, of the display panel.

The detection lines 3-1 and 3-2 are connected with the driving IC 2. In detail, the detection lines 3-1 and 3-2 may be connected with a safety driving apparatus (to be described below in a subsequent drawing), which is included in the driving IC 2 to determine the damage on the panel and to control the driving of the display device according to the determination. According to another exemplary embodiment, even if the safety driving apparatus is be disposed in the driving IC 2, both ends of the detection lines 3-1 and 3-2 are connected with the safety driving apparatus, i.e., so the safety driving apparatus detects whether or not cracks occurs, thereby controlling the driving.

Referring to FIG. 1, both ends of the detection line are connected to the safety driving apparatus (not shown) included in the driving IC 2, of which one end is a voltage input terminal 21 to which a reference voltage is applied and the other end is a voltage output terminal 22 outputting voltage of the reference voltage by returning a path of the detection line. A safety driving system of the example embodiments applies a predetermined reference voltage to the voltage input terminal 21 of the detection line, detects the output voltage thereof through the voltage output terminal 22, and monitors whether a part of the display panel 1 is damaged.

That is, if a part of the display panel 1 is damaged, e.g., due to cracks, scratches, or the like, the detection line is electrically influenced by the damage, and the output voltage at the voltage output terminal 22 deviates from a normal output range. For example, when a short occurs due to damage, an excessive current flow through the detection line, so the detected output voltage may exceed an upper limit of the normal output range. In another example, when an open occurs due to damage, the current amount flowing in the detection line is decreased, so the detected output voltage may be smaller than a lower limit of the normal output range.

In other words, when damage, e.g., cracks or scratches, occurs in the display panel 1, the detection line, i.e., the detection line 3-1 and/or the detection line 3-2, enables detection of such damage by monitoring only the signal therethrough. In other words, the detected result of the detection lines only influences a signal itself. In contrast, when similar damage occurs in a conventional panel display, i.e., a display panel without a detection line, the damage may be detected only when a power generated in the driving IC is influenced.

The safety driving system of the example embodiments detects the output voltage flowing out of the detection line to determine whether or not the display panel is damaged. The determination is done by determining whether a detection result signal, i.e., the detected output voltage, is within a predetermined output voltage range relative to a given reference voltage.

Figure 2:
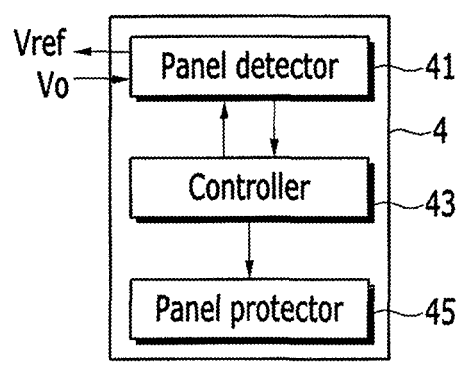
FIG. 2 is a block diagram illustrating a configuration of a safety driving apparatus of a safety driving system in the display device according to an exemplary embodiment.

FIG. 2 is a block diagram illustrating a configuration of a safety driving apparatus of a safety driving system in a display device according to an exemplary embodiment.

As described above, the safety driving apparatus may be installed in the driving IC 2, but is not limited thereto and may be installed outside. In the case where the safety driving apparatus is installed outside, the safety driving apparatus is connected with the driving IC 2 in order to transmit and receive a signal for controlling an operation of the driving IC 2. For example, a safety driving apparatus 4 of FIG. 2 is included in the driving IC 2 in FIG. 1.

The safety driving apparatus 4 detects the output voltage according to the applied reference voltage from the detection line installed on the display panel 1. Further, the safety driving apparatus 4 detects damage, e.g., cracks in the display panel 1, according to variation of the detected output voltage. Thus, when the damage to the display panel 1 is detected, the safety driving apparatus 4 interrupts an operation of an internal driver included in the driving IC 2 of the display device, thereby protecting the display panel 1. Here, the internal driver drives operations of various devices for implementing an image of the display device, e.g., may include a power source driver supplying power. In this case, the power source driver may be a DC-DC converter, e.g., the DC-DC converter may boost and output a constant voltage supplied from an external power source to a driving voltage of the display panel 1.

The safety driving apparatus 4 of FIG. 2 includes a panel detector 41, a controller 43, and a panel protector 45.

The panel detector 41 detects damage, e.g., cracks of the display panel. The panel detector 41 is connected to the voltage input terminal 21 and the voltage output terminal 22 of FIG. 1, respectively. The panel detector 41 applies a reference voltage Vref to the voltage input terminal 21 to form a current path around the detection line installed on the display panel 1. The panel detector 41 detects an output voltage Vo from the voltage output terminal 22, i.e., a last terminal of the detection line, to generate a detection result signal by comparing a highest voltage value and a lowest voltage value in the normal range for the reference voltage, respectively. A detailed circuit configuration of the panel detector 41 will be described below with reference to FIG. 3.

The controller 43 supplies various set values for detecting whether or not the display panel 1 is damaged in accordance with the detection result signal of the panel detector 41. That is, the controller 43 determines whether the detection result signal generated by the panel detector 41 is a signal in the normal voltage range of the reference voltage or a signal outside the normal voltage range in order to verify whether or not the display panel 1 is damaged.

The values set in the controller 43 are not particularly limited, but may include detection set values such as the reference voltage applied to the display panel, the normal voltage range of the output voltage for determining whether or not the display panel 1 is normal, a detection period and a detection interval of the output voltage, and an analysis of the detection result signal.

The normal voltage range of the output voltage depends on the reference voltage. As the reference voltage value is increased, a difference between the highest voltage value and the lowest voltage value of the normal voltage range may be increased.

The detection period and the detection interval of the output voltage may be set as a length of an operation period of the safety driving apparatus, e.g., operation of the panel detector, and a period corresponding to the operation interval, respectively.

The analysis of the detection result signal is to set an option of a logic analysis for determining whether the panel is normal or damaged by using the detection result signal. For example, according to a circuit configuration and a logic combination of the panel detector, when the detection result signal is at a high level, a normal display panel, i.e., without damage to the display panel 1, may be represented. In another example, when the detection result signal is at a low level, a damage display panel 1 may be represented.

Further, in order to monitor the operations of the panel detector 41 and the panel protector 45, polarities of signals transferred to a monitoring terminal may be set. Meanwhile, the controller 43 may generate and transfer respective starting signal initiating operations of the panel detector 41 and the panel protector 45.

The panel protector 45 generates and transfers a control signal which interrupts or performs operations of various drivers of the display device, e.g., a plurality of drivers included in the driving IC 2 and a power source driver controlling a driving voltage applied from an external power source. That is, when the controller 43 receives the detection result signal from the panel detector 41 representing damage to the display panel 1, the controller 43 transfers the operation starting signal to the panel protector 45 so as to prevent a fire due to an overcurrent flowing in the display panel 1 by interrupting the driving of the display device. In other words, when the controller 43 receives a signal from the panel detector 41 indicating that the display panel 1 is damaged, the controller 43 transmits a signal to the panel protector 45 to indicate that operation of the display device should be stopped.

Then, the panel protector 45 generates and transfers a control signal which stops or soft-resets the operation of the driving IC 2 or a control signal interrupting the driving of the power source driver, e.g., the DC-DC converter. As a result, operation of the driver is stopped, thereby stopping operation of the display panel. Accordingly, overcurrent does not flow, thereby preventing overheating of the display device.

In the exemplary embodiment of FIG. 2, the controller 43 and the panel protector 45 are separately configured, but are not necessarily limited thereto. That is, the controller 43 generates a control signal which directly stops or soft-resets the operation of the driving IC 2 or a control signal interrupting the driving of the power source driver, e.g., the DC-DC converter, to interrupt the driving the display panel, when the detection result signal represents the damage to the display panel.

Figure 3:
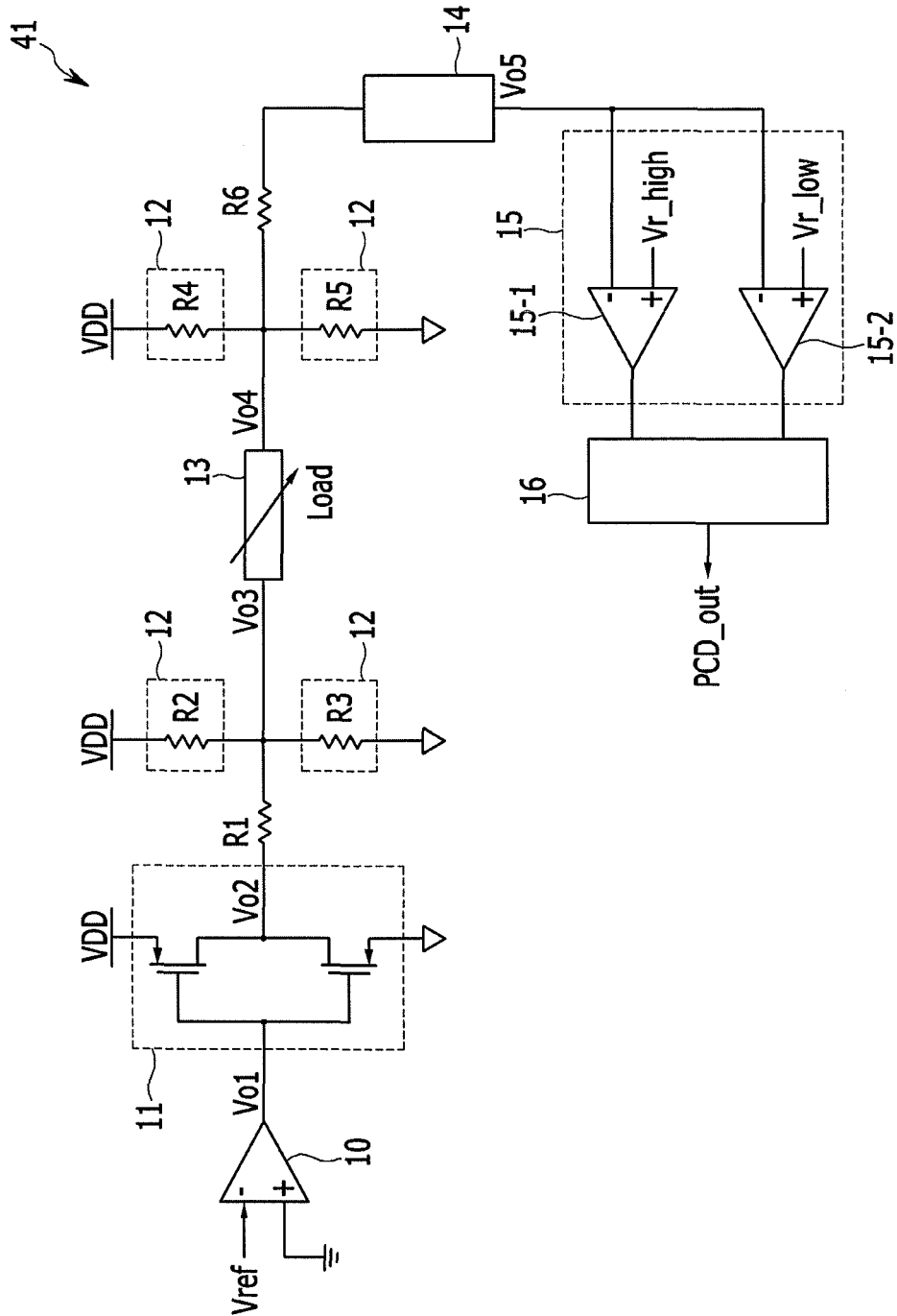
FIG. 3 is a circuit block diagram illustrating a panel detector of the safety driving apparatus of FIG. 2.

FIG. 3 is a block diagram illustrating a circuit configuration diagram of the panel detector 41 of the safety driving apparatus 4 of FIG. 2. The circuit elements configuring the panel detector of FIG. 3 are not limited to the exemplary embodiment and may include various circuit elements properly controlling voltage values on the circuit in order to determine whether a voltage output through a path of the detection line is included in a predetermined normal voltage range.

Referring to FIG. 3, the panel detector 41 includes an operational amplifier 10, a push-pull circuit 11, a plurality of resistors R1 through R6, a plurality of ESD circuits 12, a noise filter 14, a complex comparator 15, and a combination logic 16.

The operational amplifier 10 and the push-pull circuit 11 are connected to a front end of a load 13, and the complex comparator 15 and the combination logic 16 are connected to a rear end of the load 13. In some cases, the push-pull circuit 11, the plurality of resistors R1 through R6, the plurality of ESD circuits 12, and the noise filter 14 may be omitted, and the number and the size of the plurality of resistors may be controlled in response to the range of the output voltage. Here, the load 13 refers to a conductive detection line installed on the display panel.

The reference voltage Vref set in the controller 43 is applied to the detection line, i.e., to the load 13, through the predetermined circuit elements, e.g., through the operational amplifier 10, the push-pull circuit 11, and the resistor.

In the circuit diagram of FIG. 3, the operational amplifier 10 is configured of an inversion amplifier, but is not limited thereto and may be configured of a non-inversion amplifier according to a set value of the reference voltage Vref. The operational amplifier 10 of FIG. 3 inverts and outputs a voltage waveform polarity before the reference voltage Vref is applied to the detection line through the voltage input terminal. The reference voltage Vref is applied to an inversion terminal (−) of the operational amplifier 10 as an input voltage, and a ground voltage GND is applied to a non-inversion terminal (+). In addition, the polarity of the reference voltage Vref is reversed to be outputted to the output terminal of the operational amplifier 10. In this case, the output voltage is referred to as a first output voltage Vo1.

Although not shown in the circuit diagram of FIG. 3, an input resistor is installed at the front end of the inversion terminal (−) or a resistor is additionally connected to the front end of the inversion terminal (−) as a feedback circuit connecting the inversion terminal (−) and the output terminal of the operational amplifier 10, thereby amplifying or controlling the first output voltage Vo1.

The first output voltage Vo1 output from the output terminal of the operational amplifier 10 may be input to the push-pull circuit 11. The push-pull circuit 11 has a structure in which two transistors, that is, a PMOS transistor and an NMOS transistor which complementarily operate are connected between a supply source of a first power source voltage VDD and a ground terminal. In FIG. 3, a source electrode of the PMOS transistor is connected to the supply source of the first power source voltage VDD, and a source electrode of the NMOS transistor is connected to the ground terminal. In addition, respective drain electrodes of the PMOS transistor and the NMOS transistor are commonly connected to the output terminal. In this case, a second output voltage Vo2 corresponding to the first output voltage Vo1 is outputted to the output terminal. Further, gate electrodes of the PMOS transistor and the NMOS transistor are commonly connected to the input terminal to receive the first output voltage Vo1 outputted from the output terminal of the operational amplifier 10.

When the first output voltage Vo1 output from the operational amplifier 10 is input, the PMOS transistor is turned on in the voltage range between the first power source voltage VDD and the ground voltage GND in response to the voltage value to take charge of amplification of a positive (+) voltage value, or the NMOS transistor is turned on to take charge of amplification of a negative (−) voltage value. Accordingly, in the case of the positive (+) voltage value, the voltage range of the second output voltage Vo2 is a highest voltage value of the first power source voltage VDD, and in the case of the negative (−) voltage value, the voltage range is a lowest voltage value of the ground voltage GND.

For example, in the case where the reference voltage Vref is set to (+2) V, the first output voltage Vo1 passing through the operational amplifier 10 has a negative (−) voltage value, and the first output voltage Vo1 turns on the PMOS transistor above the push-pull circuit 11 to output a high level voltage as the second output voltage Vo1. In this case, the high level voltage does not exceed the first power source voltage VDD. In addition, the NMOS transistor is turned off. When the reference voltage Vref is differently set, the operation of the push-pull circuit 11 and the voltage value of the second output voltage Vo2 are varied.

The second output voltage Vo2 is applied to the load 13 in a state where the voltage value is controlled by at least one resistor R1 having a predetermined magnitude. In this case, the ESD circuit 12 protecting a circuit from static electricity may be installed at the front end of the load 13. The ESD circuit 12 may remove the static electricity which is generated abound the panel detector and influences determination of the damage to the panel or not.

Since the ESD circuit 12 is basically unrelated to the content of the example embodiments as a known static electricity protection circuit, the description for a detailed circuit structure will be omitted. However, the panel detector 41 of FIG. 3 includes a ESD circuit 12 configured of at least one resistor R2 between the supply source of the first power source voltage VDD and the voltage input terminal of the load 13, and a ESD circuit 12 configured of at least one resistor R3 between the ground terminal and the voltage input terminal of the load 13.

The second output voltage Vo2 passes through the resistor, the ESD circuit, and the like to be inputted to the voltage input terminal of the load 13 as a third output voltage Vo3.

An output voltage value which turns a detection line path as the load 13 to be outputted to the voltage output terminal of the load 13 is referred to as a fourth output voltage Vo4.

According to an exemplary embodiment, as shown in FIG. 3, the voltage output terminal of the load 13 may include an ESD circuit 12 protecting a circuit of the panel detector from the static electricity. That is, the voltage output terminal of the load 13 includes a ESD circuit 12 configured of at least one resistor R4 between the voltage output terminal of the load 13 and the supply source of the first power source voltage VDD, and a ESD circuit 12 configured of at least one resistor R5 between the voltage output terminal of the load 13 and the ground terminal.

The voltage value of the fourth output voltage Vo4 is controlled while passing through the ESD circuit and at least one resistor R6.

In addition, according to an exemplary embodiment, the fourth output voltage Vo4 may pass through the noise filter 14.

Since a coupling factor capable of influencing voltage levels of the voltage input terminal and the voltage output terminal of the load 13 may variously exist, the panel detector 41 of FIG. 3 includes the noise filter 14 to remove a coupling noise so as to exactly detect only the influence of the output voltage value due to the damage according to an impact of the display panel. In FIG. 3, the noise filter 14 is included in the rear end of the voltage output terminal of the load 13, but is not necessarily limited thereto.

In addition, the noise filter 14 may be designed according a size of the panel and a load amount so as to properly filter the coupling noise capable of occurring in a layout of the display panel. The fourth output voltage Vo4 passes through the noise filter 14 to be output to a fifth output voltage Vo5. The fifth output voltage Vo5 is applied to the complex comparator 15.

In detail, the fifth output voltage Vo5 is transferred to two comparators 15-1 and 15-2 included in the complex comparator 15, respectively to be compared with the highest voltage value and lowest voltage value of the normal voltage range set in response to the reference voltage Vref, respectively. That is, the controller 43 sets a deviation range for the reference voltage of the output voltage which can be determined as the normal display panel, together with the setting of the reference voltage Vref. When the normal voltage range is set, a highest voltage value Vr_high which is a higher voltage than the reference voltage Vref by a predetermined deviation and a lowest voltage value Vr_low which is a lower voltage than the reference voltage by the deviation are pre-set.

For example, in the case where the reference voltage Vref is (+2) V, a deviation having the predetermined normal voltage range may be set as 0.75 V, and in this case, the highest voltage value Vr_high may be set as (+2.75) V and the lowest voltage value Vr_low may be set as (+1.25) V.

The controller 43 may largely set a deviation which is the reference of the normal voltage range so as to highly set the voltage level of the reference voltage Vref.

The complex comparator 15 of the panel detector 41 compares the fifth output voltage Vo5 output through the load 13 with the highest voltage value Vr_high and the lowest voltage value Vr_low, respectively. Then, the complex comparator 15 outputs result values obtained by comparing the fifth output voltage Vo5 with the highest voltage value Vr_high, and the fifth output voltage Vo5 with the lowest voltage value Vr_low as a high or low logic signal, respectively.

In addition, the combination logic 16 is installed in the output terminal of the complex comparator 15 to properly logic-combine the outputted logic signals according to each comparator and divide a result signal in the case of the voltage range of the normal panel and a result signal in the case of the voltage of the damaged panel to be outputted as a detection output signal PCD_out.

If the fifth output voltage Vo5 is in the range of the highest voltage value Vr_high and the lowest voltage value Vr_low, the detection output signal PCD_out through the complex comparator 15 and the combination logic 16 may be output as the result signal which indicates a normal display panel. If the fifth output voltage Vo5 is higher than the highest voltage value Vr_high or lower than the lowest voltage value Vr_low, the detection output signal PCD_out may be output as the result signal which indicates a damaged display panel.

Since a configuration and a logic combination method of the combination logic 16 may vary according to a configuration of the complex comparator 15 and levels of the input-output signals of the entire circuit of the panel detector 41, detailed description thereof will be omitted.

Meanwhile, referring to FIG. 3, the complex comparator 15 may be configured of two inversion comparators, but is not necessarily limited thereto. In detail, the complex comparator 15 of FIG. 3 is configured of a first comparator 15-1 comparing the fifth output voltage Vo5 with the highest voltage value Vr_high and a second comparator 15-2 comparing the fifth output voltage Vo5 and the lowest voltage value Vr_low.

The first comparator 15-1 receives the fifth output voltage Vo5 to the inversion terminal (−), receives the highest voltage value Vr_high to the non-inversion terminal (+), and compares both voltage values to output a corresponding logic signal (high-level signal or low-level signal) to the output terminal in response to the high level voltage. In this case, a form of the output logic signal depends on the reference voltage Vref and the voltage set value of the normal voltage range.

A case where the reference voltage Vref is (+2) V, the highest voltage value is (+2.75) V, and the lowest voltage value is (+1.25) V will be described as an example. In the case where the fifth output voltage Vo5 is lower than the highest voltage value of (+2.75) V, the high-level logic signal is output in response to the highest voltage value of (+2.75) V, and in the case where the fifth output voltage Vo5 is higher than the highest voltage value of (+2.75) V, the fifth output voltage Vo5 is phase-inverted and thus the low-level logic signal corresponding thereto may be output.

Further, the second comparator 15-2 receives the fifth output voltage Vo5 to the inversion terminal (−), receives the lowest voltage value Vr_low to the non-inversion terminal (+), and compares both voltage values to output a corresponding logic signal (high-level signal or low-level signal) to the output terminal in response to the high-level voltage. In the example, in the case where the fifth output voltage Vo5 is lower than the lowest voltage value of (+1.25) V, the high-level logic signal is output in response to the lowest voltage value of (+1.25) V, and in the case where the fifth output voltage Vo5 is higher than the lowest voltage value of (+1.25) V, the fifth output voltage Vo5 is phase-inverted and thus the low-level logic signal corresponding thereto may be output.

Then, the logic signal of each comparator outputted from the output terminal of the complex comparator 15 is transferred to the combination logic 16 and divided into the logic signals of the case of the normal display panel and the case of the damage display panel to be output as the detection result signal PCD_out.

In the example, when a part of the display panel is shorted due to an external impact, and when the fifth output voltage Vo5 exceeds the highest voltage value of (+2.75) V, the first comparator 15-1 of the complex comparator 15 may output the low signal and the second comparator 15-2 may output the low signal. Further, in the case where the part of the display panel is opened due to the external impact, and when the fifth output voltage Vo5 may be lower than the lowest voltage value of (+1.25) V, the first comparator 15-1 of the complex comparator 15 may output the high signal and the second comparator 15-2 may output the high signal.

Then, the combination logic 16 combines the logic signal output from the abnormal display panel to generate the detection result signal PCD_out as a high signal or a low signal. That is, the combination logic 16 is configured of various logic gates to output the detection result signal PCD_out by combining the logic signals transferred from the complex comparator 15.

At this time, in the case of the normal display panel, since the first comparator 15-1 of the complex comparator 15 output the high signal and the second comparator 15-2 output the low signal, the combination logic 16 receives logic signals having different phases to output a logic signal which is different from the detection result signal PCD_out of the abnormal display panel. That is, the logic gates configuring the combination logic 16 are combined so that phases of the detection result signals PCD_out of the normal panel and the abnormal panel are different from each other.

Figure 4:
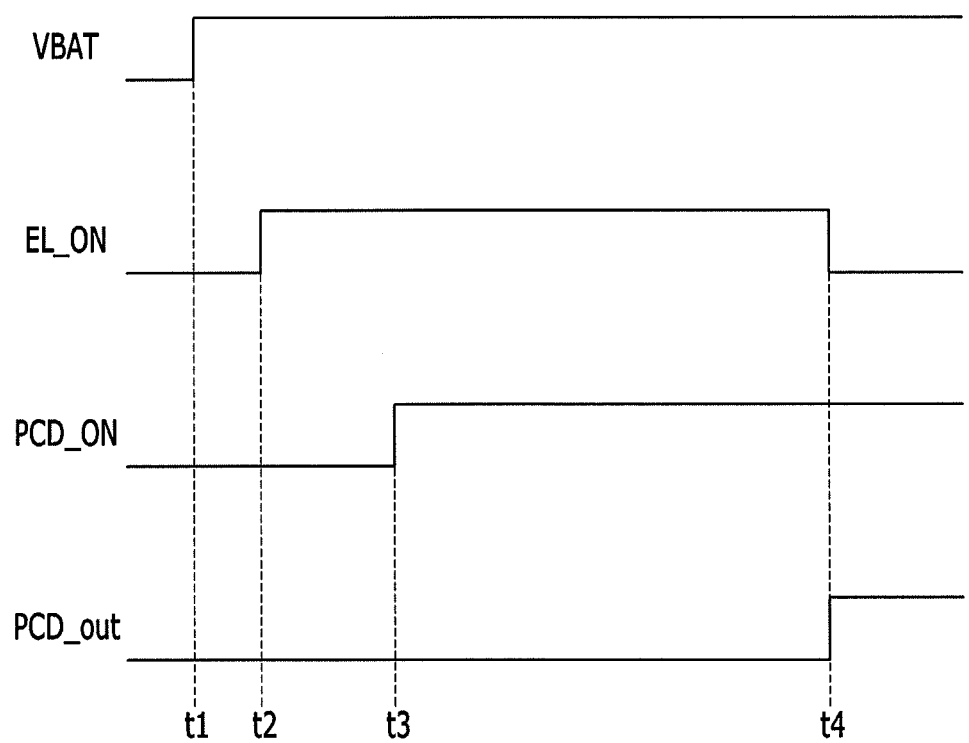
FIG. 4 is a signal waveform diagram describing a safety driving method in a display device according to an exemplary embodiment.

FIG. 4 is a signal waveform diagram describing a safety driving method in the display device according to the exemplary embodiment.

First, at a time t1, a level of a battery voltage VBAT for driving the display device is increased. Then, for a predetermined period of the time t1 to a time t2, a driving IC of the display device is boosted.

Then, at the time t2, an enable signal EL_ON for driving a power source driver controlling supply of an external voltage, particularly, an external DC-DC converter, is increased to an on-level. The display device operates in response to the enable signal EL_ON and organic light emitting elements of the display panel are driven, thereby displaying images.

The safety driving system of the display device according to the exemplary embodiment may be set so as to operate with a delay period corresponding to a period of the time t2 to a time t3. That is, the controller 43 of the safety driving apparatus in the driving IC may set the safety driving system to operate simultaneously with the driving of the display device, or set the safety driving system to operate after the delay period elapses. Further, the controller may set a period (duration) when the safety driving apparatus operates.

At the time t3, the safety driving system of the display device operates in response to an operation starting signal PCD_ON of the safety driving apparatus which is generated from the controller. That is, when the operation starting signal PCD_ON of the safety driving apparatus is increased to an on-level, the panel detector 41 of the safety driving apparatus operates. Then, the panel detector 41 detects an error or not of the voltage level due to external damage to the display panel by applying a predetermined reference voltage through a detection line of the display panel and detecting an output voltage in response thereto.

For a period of the time t3 to a time t4, the detection result signal PCD_out determining the damage to the display panel is output at a normal level. In the exemplary embodiment of FIG. 4, the detection result signal PCD_out of the normal panel has the low level, but it may depend on a configuration of the logic gates of the combination logic 16 of the panel detector 41 as described above.

In the exemplary embodiment of FIG. 4, at the time t4, the low-level detection result signal PCD_out of the normal panel is increased to the high-level. This represents a state where the output voltage is output to an over-voltage state as compared with the reference voltage or output to an opened voltage due to the damage to the display panel. Accordingly, the detection result signal PCD_out of the abnormal panel is transferred to the panel protector 45 through the controller to interrupt the driving of the display device.

In detail, the panel protector 45 transfers the detection result signal PCD_out to an internal host of the display device to soft-reset the driving IC or shut down the DC-DC converter. Then, at the time t4, the enable signal EL_ON of the DC-DC converter supplying a power source to the display device is changed to the low level.

As an exemplary embodiment, a circuit may be configured so that the driving IC may automatically perform the soft-reset, or may instruct so as to perform the soft-reset operation of the driving IC after receiving the detection result signal PCD_out from the host. As described above, in the example embodiments, methods in which the panel protector 45 interrupts the driving of the display device are various according to the detection result signal PCD_out representing the damage to the panel, and the control signal is generated according to the method to be transferred to the driver.

Therefore, according to the exemplary embodiments, it is possible to provide safety protection measures against abnormal implementation of a display screen due to the occurrence of cracks, scratches, or breakage on a module or a panel caused by external damage and damage on a product such as overheating or fire. Further, it is possible to prevent possibility of an injury to an end user in advance by early detection of an error of the display panel and embedding a driving system of safely protecting the display panel. In addition, the safety driving system in the display device can be applied from small-sized mobile apparatuses to medium and large-sized modules.

That is, according to example embodiments, even if the display panel is only partially damaged, protection from potential overheating and fire may be provided. For example, a rapid resolution may be provided for a situation when the power source applied to the display panel is shorted or opened, thereby preventing abnormal display of a screen or preventing abnormal operation of a driving power source.

In contrast, when a conventional display panel is damaged and the user is unable to detect the damage at an early stages, by the time the user is able to detect the damage with a naked eye, the breakdown of the display device may be already at a progressive stage. For example, image quality may be deformed and fire due overheating may occur and burn the user.

The drawings referred to in the above and disclosed description of the example embodiments only illustrate the example embodiments, and are intended to describe the example embodiments, not to restrict the meanings or the scope of the example embodiments claimed in the claims. Therefore, those skilled in the art can easily select and substitute the drawings and disclosed description. Those skilled in the art can omit some of the constituent elements described in the present specification without deterioration in performance thereof or can add constituent elements to improve performance thereof. Furthermore, those skilled in the art can modify the sequence of the steps of the method described in the present specification depending on the process environment or equipment. Therefore, the scope of the example embodiments must be determined by the scope of the claims and the equivalent, not by the described embodiments.

DESCRIPTION OF SYMBOLS

| 1: Display panel | 2: Driving IC |
|---|---|
| 21: voltage input terminal | 22: voltage output terminal |
| 3-1, 3-2: Detection lines | 4: Safety driving apparatus |
| 41: Panel detector | 43: Controller |
| 45: Panel protector | |

What is claimed is:

1. A safety driving method of a display device including a display panel with at least one conductive detection line detecting voltage variation according to damage to the display panel in a predetermined area, the method comprising:

applying a reference voltage to one end of the detection line by a panel detector;

receiving an output voltage corresponding to the reference voltage through the detection line from another end of the detection line by the panel detector;

comparing the received output voltage with a predetermined normal voltage range to generate a detection result signal by the panel detector; and interrupting a driving of the display panel when the detection result signal indicates damage to the display panel by a controller, wherein the panel detector and the controller are included in a driving IC, the driving IC being within the display panel to operate the display panel, wherein at least a portion of the detection line extends in parallel to an edge of the driving IC, and wherein the predetermined area is an area in close proximity to the driving IC driving the display panel.

2. The safety driving method of a display device of claim 1, further comprising, before applying the reference voltage to the detection line, pre-setting detection set values, the detection set values including the reference voltage, the normal voltage range, an operation period, a driving interval of the panel detector, and an analysis of the detection result signal.

3. The safety driving method of a display device of claim 1, wherein interrupting the driving of the display panel includes stopping operation of the driving IC driving the display panel, soft-resetting the operation of the driving IC, or interrupting driving of a DC-DC converter in the driving IC.

4. The safety driving method of a display device of claim 1, wherein comparing the received output voltage with the predetermined normal voltage range includes generating the detection result signal by logic-combining a first result value obtained by comparing the received output voltage with a highest voltage value of the predetermined normal voltage range and a second result value obtained by comparing the received output voltage with a lowest voltage value of the predetermined normal voltage range.

5. The safety driving method of a display device of claim 1, wherein generating the detection result signal includes:

removing noise of a coupling factor influencing the received output voltage; and removing static electricity generated outside.

* * * * *